United States Patent
Rayman et al.

(10) Patent No.: US 7,104,299 B2
(45) Date of Patent: Sep. 12, 2006

(54) TWO PIECE TIRE WITH IMPROVED TIRE TREAD BELT

(75) Inventors: William Earl Rayman, Hartville, OH (US); Barry Allen Matrana, Akron, OH (US); Thomas Roy Fuhrig, North Canton, OH (US); Gregory Scott Hanna, Atwater, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 248 days.

(21) Appl. No.: 10/444,527

(22) Filed: May 23, 2003

(65) Prior Publication Data

US 2003/0201047 A1    Oct. 30, 2003

Related U.S. Application Data

(60) Continuation-in-part of application No. 10/339,199, filed on Jan. 9, 2003, now abandoned, which is a division of application No. 09/840,385, filed on Apr. 23, 2001, now Pat. No. 6,561,241.

(51) Int. Cl.
*B60C 11/00* (2006.01)
*B60C 11/02* (2006.01)

(52) U.S. Cl. ............... 152/170; 152/173; 152/185; 152/209.1; 152/526; 152/531

(58) Field of Classification Search ............ 152/209.1, 152/170, 173, 175, 176, 185, 187, 188, 526, 152/531; 305/157, 165, 166, 167
See application file for complete search history.

(56) References Cited

U.S. PATENT DOCUMENTS

| | | | | |
|---|---|---|---|---|
| 2,900,785 A | | 8/1959 | Fenner | 57/153 |
| 3,503,432 A | | 3/1970 | Maiocchi | 152/176 |
| 3,557,858 A | | 1/1971 | Luggi | 152/187 |
| 3,703,202 A | | 11/1972 | Maiocchi | 152/175 |
| 4,050,495 A | * | 9/1977 | Olsen | 152/187 |
| 4,158,946 A | | 6/1979 | Bourgois | 57/213 |
| 4,289,185 A | * | 9/1981 | Franchini et al. | 152/527 |
| 4,690,191 A | | 9/1987 | Kawasaki | 152/527 |
| 4,702,293 A | | 10/1987 | Iwata et al. | 152/531 |
| 4,756,151 A | | 7/1988 | Charvet | 57/213 |
| 5,285,836 A | | 2/1994 | Kawamura | 152/451 |
| 5,351,470 A | | 10/1994 | Shinmura | 57/213 |
| 6,099,797 A | * | 8/2000 | Bhagwat et al. | 420/91 |
| 6,272,830 B1 | | 8/2001 | Morgan et al. | 57/213 |
| 6,352,090 B1 | | 3/2002 | Rayman | 152/167 |
| 6,357,498 B1 | | 3/2002 | Rayman | 152/167 |
| 6,390,165 B1 | | 5/2002 | Rayman | 152/539 |
| 6,412,534 B1 | | 7/2002 | Kohno et al. | 152/527 |
| 2002/0134478 A1 | | 9/2002 | Noferi | 152/451 |

FOREIGN PATENT DOCUMENTS

DE    19649507    *    4/1998

* cited by examiner

*Primary Examiner*—Justin Fischer
(74) *Attorney, Agent, or Firm*—Nancy T. Krawczyk

(57) ABSTRACT

A two-piece tire assembly has a removable tread belt 12 for installing about the circumference of a tire carcass 14. The tread belt has at least a pair of belt layers, and one layer comprising inextensible reinforcing cables inclined at substantially zero degrees relative to the circumferential direction of the tire assembly. The cables in zero degree ply have a tensile breaking load of at least 50,000 N.

18 Claims, 4 Drawing Sheets

TWO PIECE TIRE WITH IMPROVED TIRE TREAD BELT

RELATED APPLICATIONS

The present application is a Continuation-in-Part of U.S. patent application Ser. No. 10/339,199, filed Jan. 9, 2003, now abandoned which was a divisional of application Ser. No. 09/840,385, filed Apr. 23, 2001, now issued as U.S. Pat. No. 6,561,241, May 13, 2003.

FIELD OF THE INVENTION

The disclosed invention is directed towards a two piece tire. More specifically, the present invention is directed toward a steel cable, and the use of the steel cable as a reinforcement means in the tread belt for a two piece tire of a particular size range.

BACKGROUND OF THE INVENTION

The tread belt pneumatic tires of the present invention are generally designed for use on large earthmover vehicles and are subjected to high stress and loads under harsh environmental conditions such as in rock quarries, mines, foundries, and other areas where tires are subjected to puncture-producing and wear-inducing conditions.

The large pneumatic tires, which are typically used for earthmoving vehicles, sometimes fail due to the high stress and loads caused by the harsh environmental conditions in which they are operated. With the continual drive to improve earthmover performance, there is a continuing need to provide novel methods and tire designs for improving earthmover tire durability.

SUMMARY OF THE INVENTION

It is an object of the present invention to provide a pneumatic tire for an earthmover vehicle, the pneumatic tire being as defined in one or more of the appended claims and, as such, having the capability of being constructed to accomplish one or more of the following subsidiary objects.

It is another object of the present invention to provide an improved tire and removable tread belt assembly for an earthmover vehicle wherein the frequency of premature tire failure has been substantially reduced.

Still another object of the present invention is to provide an improved tire and removable tread belt assembly with a unique tread belt that is restrained from expanding radially outwardly.

A further object of the present invention is to provide an improved tire and removable tread belt assembly wherein the tire treads will maintain a more flat tread profile which will improve tread life and durability.

A still further object of the present invention is to provide an improved tire and removable tread belt assembly wherein the belt is constructed to provide penetration protection.

Disclosed herein is a tread belt for a two-piece tire assembly aimed at improved durability and rock penetration resistance for the tread belt. The two-piece tire assembly has a removable tread belt for installing about the circumference of a tire carcass. The tire carcass has an inflated and unloaded outer circumferential surface having an axial dimension no greater than the axial width of the removable tread belt. Within the tread belt is least two belt layers and a layer comprising inextensible reinforcing cables inclined at substantially zero degrees relative to the circumferential direction of the tire assembly. The zero degree layer is the strength carrying layer in the tread belt. To achieve the necessary durability and strength characteristics, the reinforcing cables have a tensile breaking load of at least 50,000 N.

As the zero degree layer is the strength carrying layer in the tread belt, the reinforcing means in the other tread belt layers do not have a tensile strength as great as the reinforcing means in the zero degree layer. The tensile strength ratio between the reinforcing cables layer of the zero degree layer and the reinforcing strands or cables of the at least pair of belt layers has a range of 1:0.40 to 1:0.90.

The reinforcing cables of the zero degree layer are formed of numerous filaments. Prior to cable formation, the filaments are coated with brass or zinc for adhesion and corrosion resistance.

The reinforcing cables of the zero degree layer are formed from several strands each consisting of multiple filaments. There is a center strand surrounded by a plurality of sheath strands. The center strand has a strand surrounded by at least one sheath layer of filaments. To improve the durability of the center stand and the cable itself, the core of the center strand is formed of at least three filaments. The cable may have six or seven sheath strands.

In another aspect of the invention, the reinforcing cables of the zero degree layer have a 7× construction, wherein the 7× construction has a center strand.

In one aspect of the invention, the layer comprising the zero degree inclined cables is located between a pair of belt layers. In another aspect, the layer comprising the zero degree inclined cables is located radially outward of the belt layers.

In another aspect of the invention, the tread belt has an additional layer comprising reinforcing means. In this layer, the reinforcing means are inclined at an angle greater than 80° relative to the circumferential direction of the tire assembly. This third layer may be located radially outward or inward of the at least two belt layers.

DEFINITIONS

For ease of understanding this disclosure, the following terms are disclosed:

"Apex" means a non-reinforced elastomer positioned radially about a bead core;

"Axial" and "axially" mean lines or directions that are parallel to the axis of rotation of the tire;

"Bead" means that part of the tire comprising an annular tensile member wrapped by the carcass ply and shaped, with or without other reinforcement elements such as flippers, chippers, apexes, toe guards, and chafers, to fit the design rim;

"Belt or breaker reinforcing structure" means at least two layers of plies of parallel strands, woven or unwoven, underlying the tread, unanchored to the bead;

"Cable" means at least two strands bunched or stranded together to form a reinforcing structure;

"Circumferential" means lines or directions extending along the perimeter of the surface of the annular tread perpendicular to the axial direction;

"Chafers" refers to narrow strips of material placed around the outside of the bead to protect strand plies from degradation and chaffing caused by movement of the rim against the tire;

"Chippers" means a reinforcement structure located in the bead portion of the tire;

"Equatorial plane (EP)" means the plane perpendicular to the tire's axis of rotation and passing through the center of its tread;

"Filament" means a generic term for the unit structure used as an individual element in a strand or cable;

"Flipper" means a reinforced fabric wrapped about the bead core and apex;

"Lay length" means the distance at which a twisted filament structure or strand travels to make a 360° rotation about another strand;

"Nominal rim diameter" means the diameter of the rim base at the location where the bead of the tire seals;

"Normal inflation pressure" refers to the specific design inflation pressure at a specific load assigned by the appropriate standards organization for the service condition for the tire;

"Normal load" refers to the specific load at a specific design inflation pressure assigned by the appropriate standards organization for the service condition for the tire;

"Ply" means a continuous layer of rubber-coated parallel strands;

"Radial" and "radially" mean directions extending radially toward or away from the axis of rotation of the tire;

"Strand" means a reinforcing structure formed of at least one filament. A strand may be used alone for reinforcing or multiple strands may be grouped together to form a cable; and "Twist" means the number of turns about its axis per unit of length in a strand, or strand.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principals of the invention and should not be taken in a limiting sense. The scope of the invention is best determined by reference to the appended claims.

Figure 1:
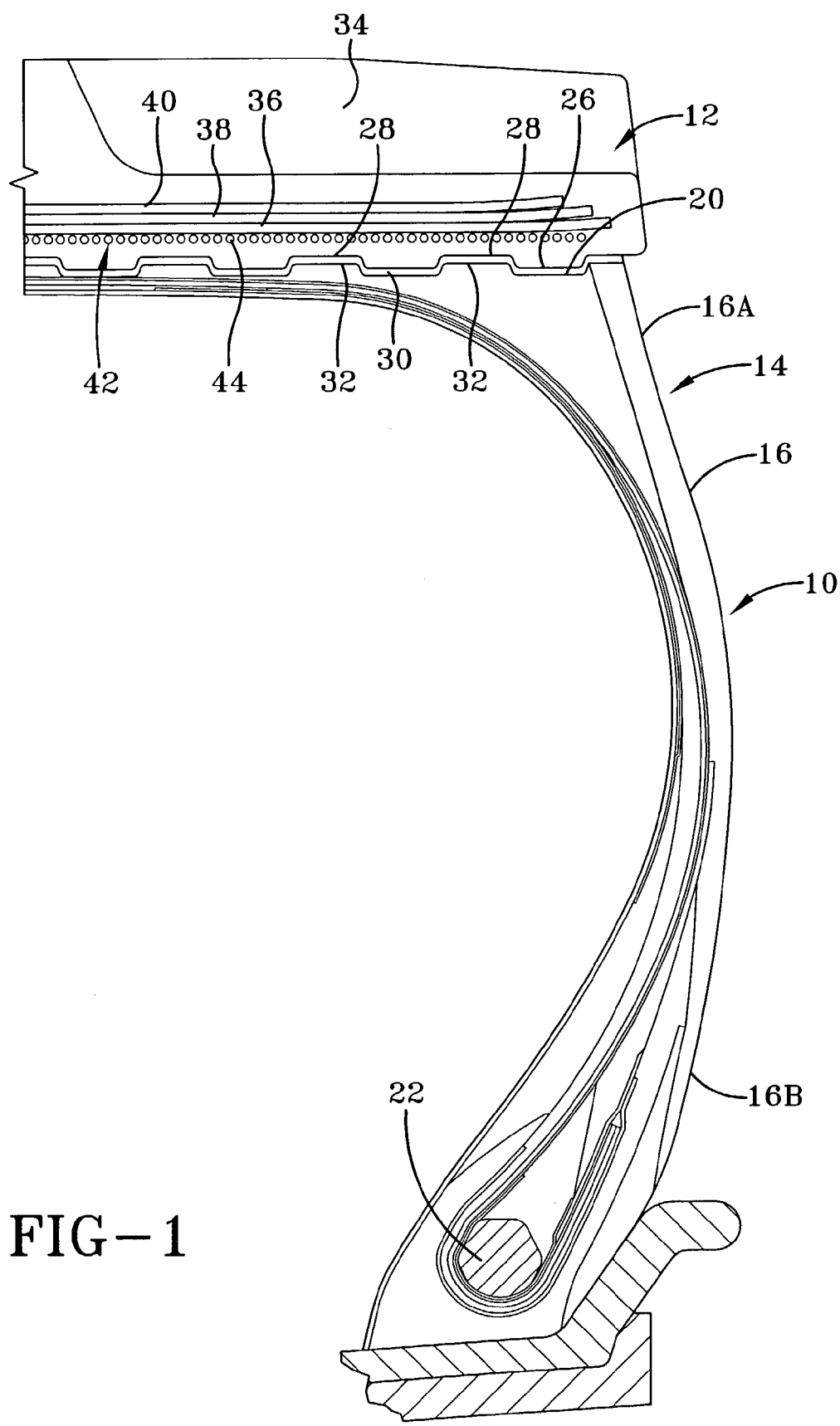
FIG. 1 is a cross-section view of one half of a two-piece tire.

With reference to FIG. 1, there is illustrated a cross-section of a two-piece pneumatic tire 10. In the specific exemplary embodiment illustrated is a size 45R57 earthmover tire. When properly inflated, the tire has a 144.0 inch (366 cm) maximum inflated outside diameter, a 47.5 inch (121 cm) maximum inflated width tire in the axial direction, and a nominal inside bead diameter of 57 inches (145 cm). The tires are typically inflated to a pressure of about 100 pounds per square inch (psi) with air and sometimes with an air/nitrogen mixture.

The improved tread belt pneumatic tire 10 includes a ground engaging, circumferentially extending tread belt 12 mounted on a radially reinforced, beaded tire carcass 14. The beaded tire carcass 14 generally includes a pair of tire sidewalls 16 extending radially inwardly from the outer circumferential surface 20 of the tire carcass and terminating at their radial extremities in a pair of bead wires 22. The sidewalls 16 each have an upper portion 16A in the shoulder region of tire carcass 14 and radially inward of the maximum section width of the tire carcass, and a lower portion 16B adjacent the bead wires 22 and radially inward of the maximum section width of the tire carcass 14. The details of the construction of tire carcass 14 are best described in co-owned patent application Ser. No. 09/840,385, filed Apr. 23, 2001 and Ser. No. 10/339199, filed Jan. 9, 2003, both of which are fully incorporated herein by reference.

The ground engaging, circumferentially extending tread belt 12 is manufactured, i.e. built or assembled and cured, separately from the tire carcass 14 and is removably mounted onto the tire carcass 14. The underside or inner circumference surface of tread belt 12 comprises a plurality of annular lands 26 and grooves 28 that mate with grooves 30 and lands 32 of tire carcass 14 to restrain tread belt 12 from lateral or axial movement with respect to the carcass 14. The tire tread belt 12 includes a tread portion 34 and a plurality of belt layers 36, 38, 40.

The radially inner belt layers 36, 38 are reinforced with cables. Each tread belt layer 36, 38 has the cables oriented at an angle of 15° to 60° relative to the circumferential direction and with a spacing of at least 3 cables per inch. Preferably, the cables in these adjacent layers 36, 38 are inclined at relatively equal angles but oppositely oriented; the relative orientation of the layers may be varied to achieve different performance characteristics. The radially outermost third layer 40 has strands oriented at an angle of greater than 80° relative to the circumferential direction.

The reinforcing means in the three layers 36, 38, 40 may be constructed from any conventional reinforcing cables or any cables that may be developed that are useful for reinforcing elastomeric articles. Known materials include, but are not limited to, aramid, polyester including PET and PEN, all types of nylon, carbon fiber, steel, and fiberglass. The cables in the third layer 40 may the same or have a different cable construction as the cables in the two layers 36, 38.

Radially inward of these belt layers 36, 38, 40 is a reinforcement layer 42 that is the main strength and load carrying layer. The layer is reinforced with cables 44 oriented at 0°, plus or minus 1–2°, relative to the circumferential direction. The belt layer 42 encircles the tire tread belt 12 and restricts the radially outward growth of the tread belt 12 that can be caused by serious deflection in the tire carcass 14. By keeping the tire tread belt 12 from expanding radially outward, the tread 34 will maintain a more flat tread profile thereby improving tread life and durability. The 0° oriented layer 42 also eliminates the need for a larger number of belt layers than specified herein.

To achieve the desired restriction force from the 0° layer 42, the reinforcement in the layer has a desired high strength. The necessary strength is dependent upon the tire size. As the tire 10 increases in the designed diameter, the possibility for deflection increases, thus the need for a stronger 0° ply. For tires 10 having a nominal rim diameter of greater than 57 inches (145 cm), it is preferred that the individual cables 44 used as reinforcement in the 0° ply 42 have a tensile breaking load of at least 50,000 N (5,099 $kgm_f$). As the main load carrying layer in the tread belt 12, the tensile strength of the cables 44 of layer 42 should be greater than the tensile strength of the reinforcing strands or cables in the other belt layers 36, 38, 40; the strength ratio of the reinforcing means in layer 42 to the tensile strength of the reinforcing means in the other layers ranges from 1:0.4 to 1:0.90. The high strength and cable angle orientation of the 0° layer 42 enables the tread belt 12 to resist rock cutting.

The belt layer 42 is illustrated as directly adjacent to the radially outer layer 36. Alternatively, the gauge as measured from the bottom of belt layer 42 to the middle of the adjacent belt layer 36 may be varied to achieve a greater distance between these two belts 36, 42 than exists between the other adjacent belt layers. This may be achieved by placing a rubber layer with the desired gauge between the adjacent layers 36, 42 or by increasing the thickness of the compound in one or both layers 36, 42 when calendering the respective cables of the layers 36, 42.

Figure 2:
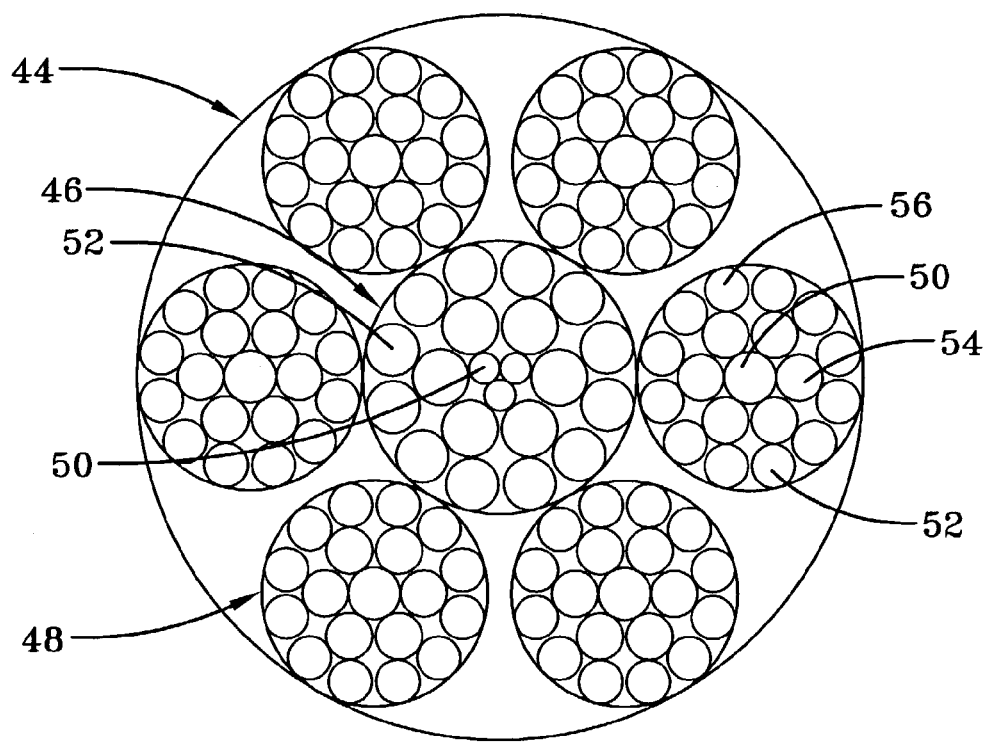
FIG. 2 is a cross-sectional view of a steel cable.

A cable that meets the requirement is the cable 44 illustrated in FIG. 2. The cable 44 has a plurality of strands, with a center strand 46 surrounded and wrapped by outer sheath strands 48. Each strand 46, 48 has a core 50 formed by at least one filament 52, and at least one sheath layer 54 of filaments 52 surrounding the strand core 50. The illustrated strands 46, 48 have a second sheath layer 56 of filaments 52. The illustrated cable 44 has the construction of 3+6+12+6×(1+6+12), excluding filament dimensions.

The center strand 46 has a core 50 formed of at least 3 filaments 52 twisted together. If the center strand 46 has a core 50 formed of a single filament with a relatively large filament, the single filament would exhibit poor fatigue properties. The poor fatigue results from the repetitive bending stresses induced in the filament as the tire assembly travels through the tire footprint and the requirement of the tread belt 12 to maintain a circular configuration. As a result of the repetitive cycling through the footprint, the filament can break. By forming the center strand core 50 from a plurality of twisted filaments such that the diameter of the twisted filament core is approximately that the same as if the core were formed from a single filament, the fatigue resistance and durability of the center strand 46, and thus the cable 44, is improved. Also, twisting the filaments to form the core 50 of the center strand 46 eliminates potential migration of the twisted core 50 from the center strand 46. Should one or more of the twisted filaments break, the remaining unbroken filaments will hold the broken filament in place due to the twisted configuration of the strand core 50. Thus, migration of the broken filament(s) from the core 50 is prevented.

Additionally, forming the core 50 of the center strand 46 from multiple filaments allows each filament to be in contact with each other filament forming the core 50. By allowing each filament to be in contact with each other filament, any gapping that could form between the respective filaments is minimized. An additional benefit of forming the core from multiple filaments is that the shape of the core becomes dimensionally sufficient to fill the area internal of the adjacent sheath layer 54.

Outward of the core 50 of the center strand 46 is at least one sheath layer 54. Herein, for the illustrated strand 46, six filaments form an intermediate sheath layer 54. The intermediate sheath layer 54 has at least six filaments so that the core filaments are sufficiently enclosed; the maximum number of filaments is 12. For the center strand 46, the filaments 52 forming the intermediate sheath layer 54 have a diameter greater than the filaments 52 forming the core 50 of the center strand 46.

Adjacent to the sheath layer 54 is an outermost sheath layer 56; illustrated as having 12 filaments. The outermost sheath layer 56 has a 10 to 16 filaments, the number being sufficient to enclose the intermediate sheath layer 54, so the number may be dependent upon the number of filaments 52 in the intermediate sheath layer 54. The filaments 52 having a diameter similar to the diameter of the filaments in the adjacent sheath layer 54. In one embodiment, the center strand has a construction of 3×0.32+6×0.58+12×0.54, the filament diameters expressed in mm.

All of the sheath strands 48 are identical to each other. Each sheath strand 48 has a core 50, formed of 1 to 3 filaments. The diameter for the filaments forming the strand core 50 decreases as the number of filaments forming the core 50 increases. Outward of the core 50 is at least one sheath layer. Illustrated are two sheath layers 54, 56. The intermediate sheath layer 54 has six filaments; the outer sheath layer 56 has twelve filaments. The number of filaments 52 in each sheath layer 54, 56 varies in the same manner as the center strand 46. For the illustrated embodiment, the sheath strand construction is 1×.0.54+6×0.48+12×0.45.

The diameter of the center strand 46 and the sheath strands 48 are illustrated as substantially similar. The selection of the filament diameters of the different strand layers enables the strands to have a substantially similar diameter. As the strength requirement of the cable 44 selected for a particular tire size increases, the diameter of the center strand 46 may also increase to be greater than the diameter of the sheath strands 48. Whatever cable size is selected, the filaments forming the core 50 of the center strand 46 should not be larger than any other filaments in the cable.

Figure 3:
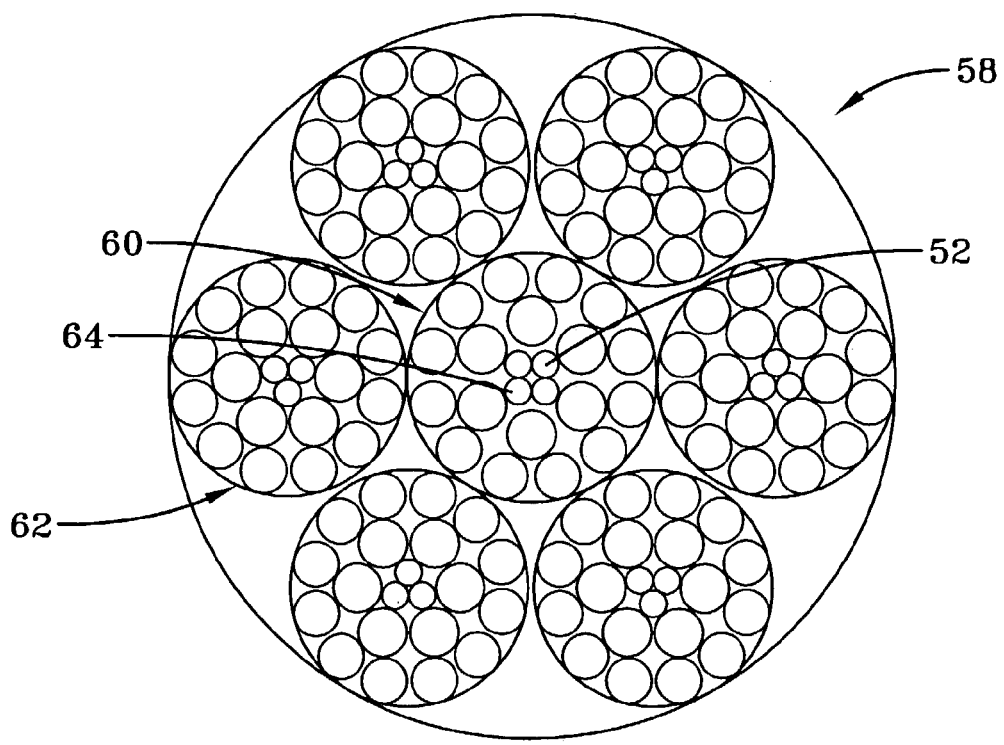
FIGS. 3–5 are different embodiments of the steel cable.
Figure 4:
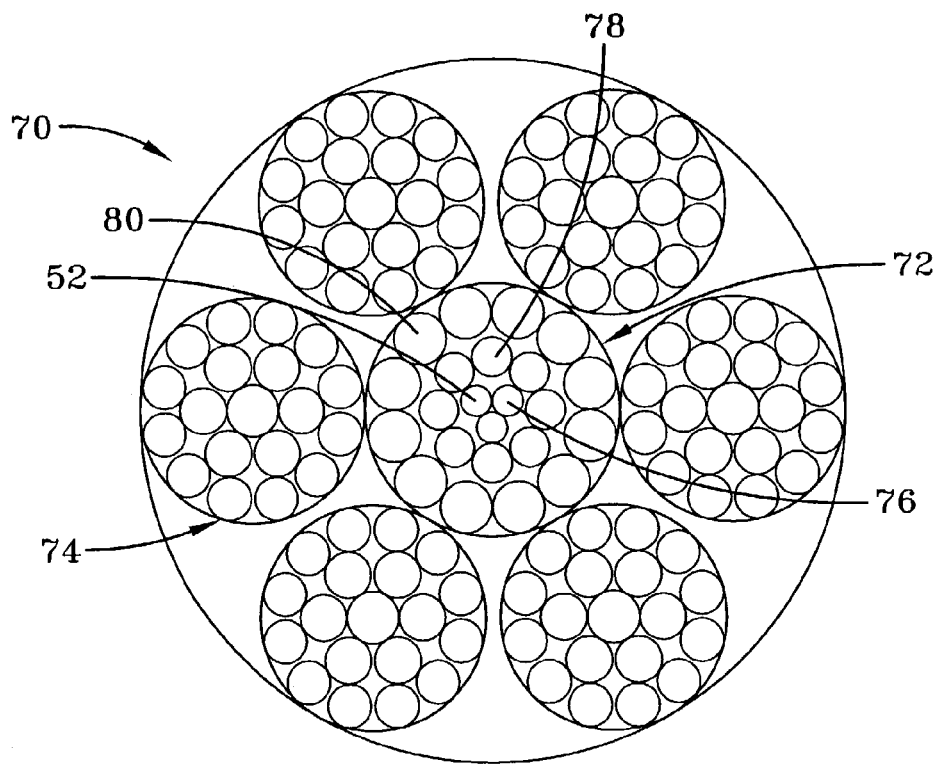

FIGS. 3 and 4 illustrate variations of the cable of FIG. 2. In FIG. 3, cable 58 has a center strand 60 with a core 64 formed from four filaments 52. In the sheath strands 62, the strand core 64 is formed from three filaments 52. In FIG. 4, the cable 70 has a center strand 72 with a core 76 formed from three filaments 52, and an intermediate sheath layer 78 of eight filaments 52, and an outermost sheath layer 80 of twelve filaments. In the sheath strands 74, the construction is the same as for the first embodiment cable 44. The two cables so far disclosed are known as 7× constructions wherein the cable is formed by 7 strands.

Figure 5:
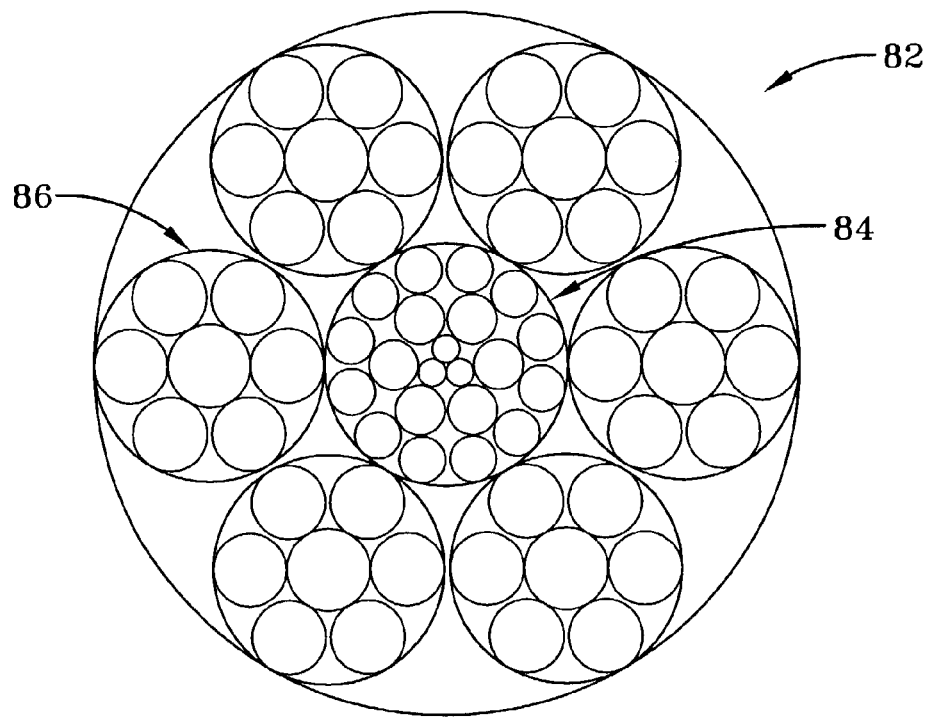

Another suitable reinforcement means in the zero degree layer 42 that has the required strength is the cable 82 of FIG. 5. The cable 82 is formed with a center strand 84 and seven sheath strands 86. The center strand 84 has a 3+6+12 configuration. The sheath strands 86 have a 1+6 configuration. Again, similar to the other cables discussed, the strand core 88 in the center strand 84 is formed of at least 3 filaments. Selection of the filament size enables the cable 82 to have a tensile breaking load greater than 50,000 N (5,099 kgmf). This cable is also known as a 21+7×7.

The steel filaments used the selected cable construction have a diameter in the range of 0.15 mm to 0.50 mm. Prior to forming the cables, the steel filaments are coated for corrosion resistance and improved adhesion to the surrounding elastomer. The coating may be a brass or zinc coating. Both types of coating are suitable for the large tire application of the present invention. Zinc coating has greater heat and corrosion resistance than brass coating. Zinc coating also requires a higher curing temperature is required for the zinc coating than for the brass coating. The cables are laid at an end count of 2 to 3 ends per inch (e.p.i.)

The first reinforcement layer 36 has lateral ends located axially outward of the lateral ends of the belt layers 38 and 40. As illustrated, the lateral ends of the belt layers 36, 38, and 40 are staggered. The lateral ends of the 0° layer 42 are axially inward of the adjacent layer 36. By insuring that at least belt layer 36 overhangs or extend beyond the 0° layer 42, the first reinforcement layer 36 provides added protection against cut damage of the cables 44. As can be easily appreciated as a large sharp rock is rolled over in the path of the tread belt, the lateral ends of the tread belt can deflect and the belt layers 36, 38, by overhanging, actually can bend over the 0° cables 44, stopping the rock from cutting the cables 44.

Figure 6:
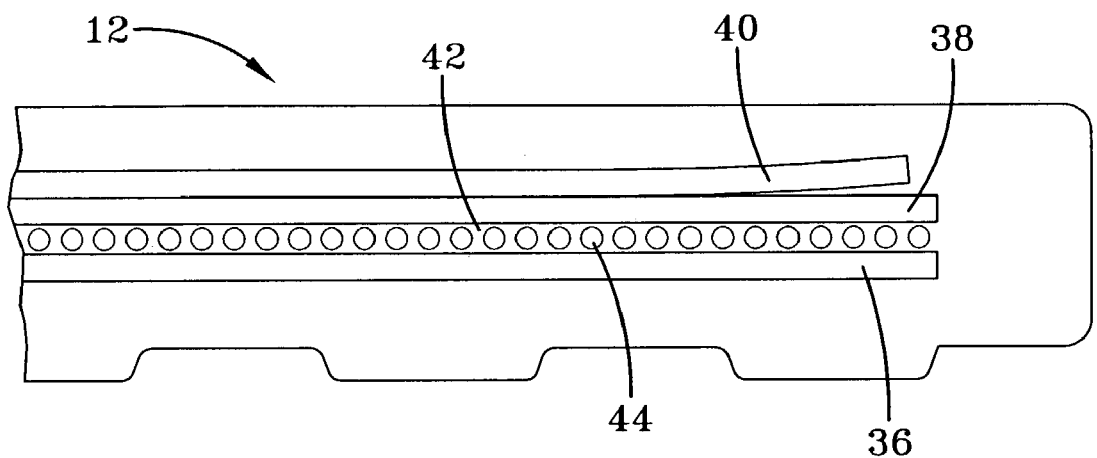
FIGS. 6–7 are alternative embodiments of the lay-up order in the tread belt.
Figure 7:
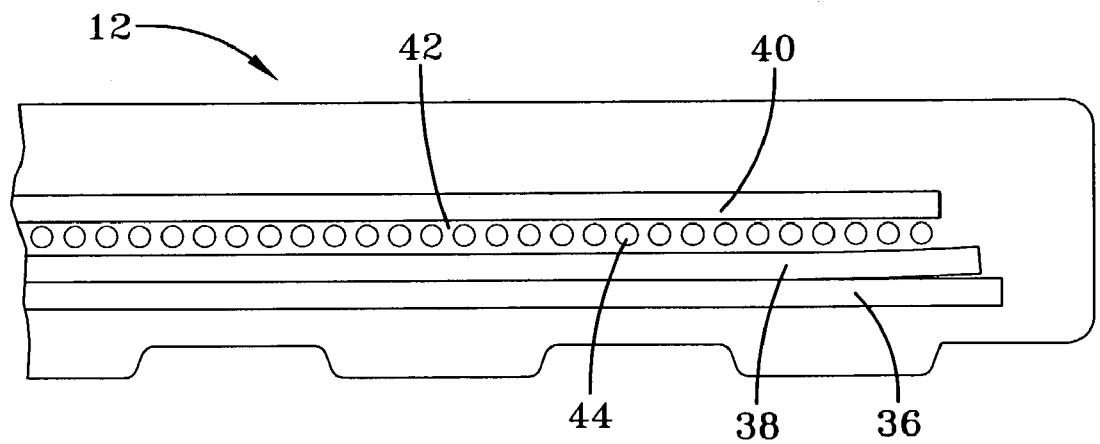

While one lay-up order of the belts 36, 38, 40, 42 is illustrated, the lay-up order may be modified to vary the tread belt characteristics. The zero-degree layer 42 may be located between the inclined belt layers 36, 38, see FIG. 6, or radially outward of the inclined belt layers 36, 38, see FIG. 7. Alternatively, the 90° layer 40 may be located radially beneath the inclined belt layers 36, 38.

While three tread belts, in combination with a single zero degree belt, are illustrated, it is within the scope of the invention to use other numbers of tread belt layers as needed. The combination of a removable tire tread belt 12 with a tire carcass 14 for use with large earthmoving vehicles is important in that it enables a portion of a tire 10 to be replaced instead of the entire tire in the event that one portion of the tire, i.e., the tire belt 12 or the tire carcass 14, wears out before the other part. Also, it may be desirable to have different types of tread designs such as, for example, driving or steering tread designs. This feature allows for a less expensive means of changing the tire tread to construct the appropriate style of desired tire. This feature would greatly reduce the cost of storing spare tires and could even extend the operating time of the tires.

What is claimed is:

1. A two-piece tire assembly having a removable tread belt for installing about the circumference of a tire carcass and a tire carcass having an inflated and unloaded outer circumferential surface having an axial dimension no greater than the axial width of the removable tread belt, wherein
    the tread belt is comprised of at least a pair of belt layers, one layer comprising inextensible reinforcing means inclined at an angle greater than 80° relative to the circumferential direction of the tire assembly, and one layer comprising inextensible reinforcing cables inclined at substantially zero degrees relative to the circumferential direction of the tire assembly,
    the reinforcing cables having a tensile breaking load of at least 50,000 N.

2. The two-piece tire assembly of claim 1 wherein the at least pair of belt layer are comprised of reinforcing strands or cables having a tensile strength, and the tensile strength ratio between the reinforcing cables layer of the zero degree layer and the reinforcing strands or cables of the at least pair of belt layers has a range of 1:0.40 to 1:0.90.

3. The two-piece tire assembly of claim 1 wherein the reinforcing cables are comprised of filaments, the filaments being brass or zinc coated.

4. The two-piece tire assembly of claim 1 wherein the layer comprising the zero degree inclined cables is located between the pair of belt layers.

5. The two-piece tire assembly of claim 1 wherein the layer comprising the zero degree inclined cables is located radially outward of the pair of belt layers.

6. The two-piece tire assembly of claim 1 wherein the layer comprising reinforcing means inclined at an angle greater than 80° is located radially outward of the at least two belt layers.

7. The two piece tire assembly of claim 1 wherein the reinforcing cables are comprised of a center strand surrounded by a plurality of sheath strands, the center strand being comprised of a core surrounded by at least one sheath layer of filaments, the core of the center strand being formed of at least three filaments.

8. The two piece tire assembly of claim 7 wherein the reinforcing cables are comprised of 6 or 7 sheath strands.

9. The two piece tire assembly of claim 1 wherein the reinforcing cables have a 7× construction, wherein the 7× construction has a center strand, the center strand having a core formed by at least three filaments.

10. A removable tread belt for installing about the circumference of a tire carcass after the tread belt and tire carcass have been separately assembled and cured, wherein
    the tread belt is comprised of at least a pair of belt layers, one layer comprising inextensible reinforcing means inclined at an angle greater than 80° relative to the circumferential direction of the tire assembly and one layer comprising inextensible reinforcing cables inclined at substantially zero degrees relative to the circumferential direction of the tire assembly,
    the reinforcing cables having a tensile breaking load of at least 50,000 N.

11. The tread belt of claim 10 wherein the at least pair of belt layer are comprised of reinforcing strands or cables having a tensile strength, and the tensile strength ratio between the reinforcing cables layer of the zero degree layer and the reinforcing strands or cables of the at least pair of belt layers has a range of 1:0.40 to 1:0.90.

12. The tread belt of claim 10 wherein the reinforcing cables are comprised of filaments, the filaments being brass or zinc coated.

13. The tread belt of claim 10 wherein the layer comprising the zero degree inclined cables is located between the pair of belt layers.

14. The tread belt of claim 10 wherein the layer comprising the zero degree inclined cables is located radially outward of the pair of belt layers.

15. The tread belt of claim 10 wherein the layer comprising reinforcing means inclined at an angle greater than 80° is located radially outward of the at least two belt layers.

16. The tread belt of claim 10 wherein the reinforcing cables are comprised of a center strand surrounded by a plurality of sheath strands, the center strand being comprised of a core surrounded by at least one sheath layer of filaments, the core of the center strand being formed of at least three filaments.

17. The tread belt of claim 16 wherein the reinforcing cables are comprised of 6 or 7 sheath strands.

18. The tread belt of claim 10 wherein the reinforcing cables have a 7× construction, wherein the 7× construction has a center strand, the center strand having a core formed by at least three filaments.

* * * * *